Sept. 4, 1956           J. PEARSON ET AL         2,761,309
METHOD FOR DETERMINING HIGH INTENSITY TRANSIENT
STRESSES IN IMPULSIVELY LOADED BODIES
Filed March 24, 1954
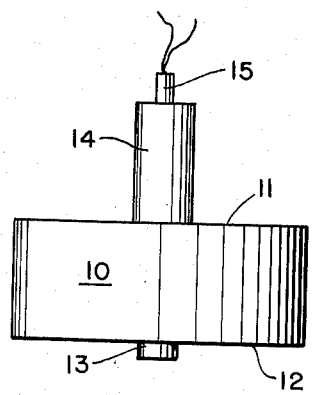
Fig. 1.
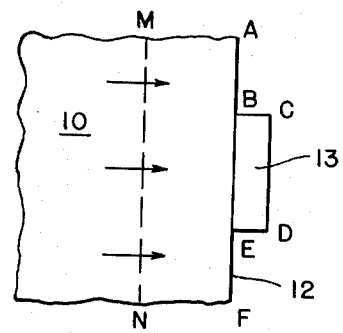
Fig. 4A.
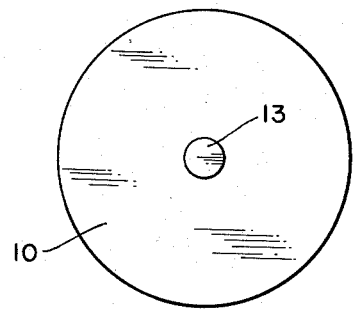
Fig. 2.
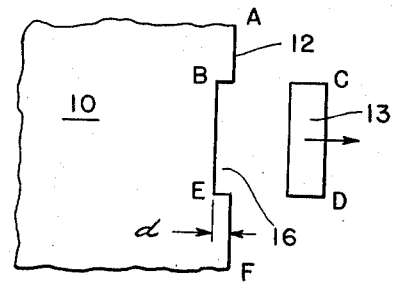
Fig. 4B.
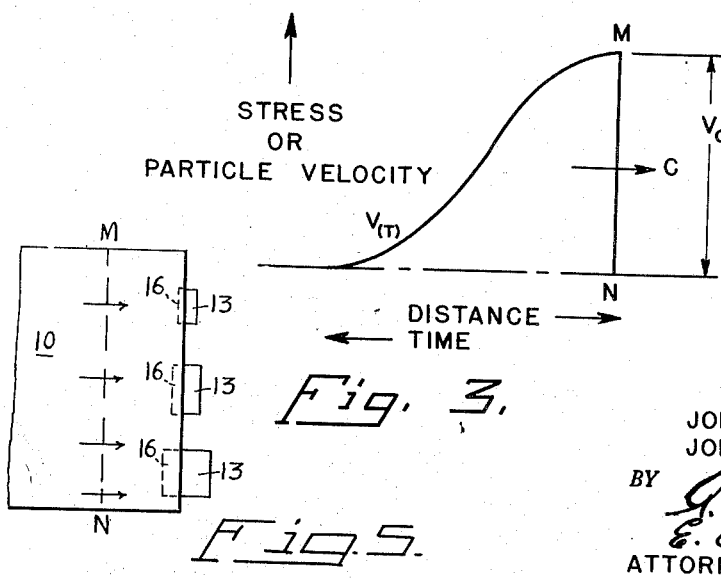
Fig. 3.
Fig. 5.
INVENTORS
JOHN PEARSON
JOHN S. RINEHART
BY
ATTORNEYS

United States Patent Office

2,761,309
Patented Sept. 4, 1956

2,761,309

METHOD FOR DETERMINING HIGH INTENSITY TRANSIENT STRESSES IN IMPULSIVELY LOADED BODIES

John Pearson and John S. Rinehart, China Lake, Calif., assignors to the United States of America as represented by the Secretary of the Navy Application March 24, 1954, Serial No. 418,485

18 Claims. (Cl. 73—12)

(Granted under Title 35, U. S. Code (1952), sec. 266)

The invention described herein may be manufactured and used by or for the Government of the United States of America for governmental purposes without the payment of any royalties thereon or therefor.

The present invention pertains to the field of stress analysis and has particular reference to a novel method for determining high intensity transient stresses in impulsively loaded bodies.

Quantitative information on the high intensity transient stresses generated by impulsive loading of a body is often required in order to effectively design against failure under such loads and to effectively utilize the transient disturbances in given applications. Rational design of equipment and materials with the view to preventing failure thereof under impulsive or shock loads, such as might be produced by high speed impact and explosive charges, requires good quantitative data concerning the magnitude, duration, and nature of variation of such loads with time. Moreover, transient disturbances generated in impulsively loaded bodies have not been effectively utilized in numerous applications owing to the lack of such information. The physical quantities of the greatest interest in the design of impulsively loaded bodies are particle velocity and rate of propagation of the transient disturbances induced within the body or, in other words, the spatial and temporal distributions of particle velocity both on the surfaces of and within the body that has been impulsively loaded. When particle velocity and wave propagation rate are known, the associated stress magnitude can generally be obtained. Good quantitative data on particle velocity has, in the past, been difficult to obtain since, in most cases, the duration of the disturbance is only a few microseconds and the magnitude of pressures involved may be several hundred thousand pounds per square inch or greater.

Heretofore, various optical, electronic, and mechanical arrangements have been employed to obtain information in specific cases, a novel approach being generally required in each case, there heretofore being no universally applicable technique. Prior photographic and mechanical arrangements have apparently been the best suited to obtain the required data since the delay problems encountered in electronic arrangements, while not unsurmountable, often introduced serious complications. The various prior photographic and mechanical arrangements have not been completely satisfactory, however, since it was often impossible or impractical to place the measuring or photographic equipment at the proper location for the measurements to be taken or recorded and have such equipment function at the proper time, such as, when it is desired to determine the stresses generated in a projectile upon the latter striking its target. Further, such prior testing arrangements were relatively complex, expensive, difficult to set up and adjust, and were time consuming to practice and, therefore, were neither appropriate nor desirable for stress determinations involving destruction of the test body and equipment.

The present invention avoids the disadvantages which have been associated with prior art transient stress measuring arrangements by providing a novel method for enabling accurate quantitative determinations to be made of particle velocity within a transient stress wave, and hence stress intensity itself, which method and apparatus are relatively simple in their application and construction, and which permit stress measurements to be taken on projectile deceleration on impact, metal fragmentation and deformation under the action of the explosive charges, and in other situations where it has heretofore been impractical to make such quantitative measurements.

In accordance with the foregoing, it is an object of the present invention to provide an improved method for determining high intensity transient stresses in impulsively loaded bodies.

Another object of the invention is to provide a method for determining high intensity stresses as in the foregoing which is relatively simple and inexpensive to practice, and which permits an accurate determination to be made of such stresses though fragmentation of the test object occurs.

Still a further object of the invention is to provide a method for accurately determining high intensity transient stresses in impulsively loaded bodies which permits accurate assessment of such stresses on relatively small test objects, or where fragmentation of the test object may occur.

And another object of the invention is to provide a method for determining transient stresses as in the foregoing wherein stress determination is achieved through the measurement of the depth of the engravement left by a pellet affixed to the workpiece and which is propelled therefrom after the workpiece has been subjected to an impulsive load.

Other objects and many of the attendant advantages of the present invention will become apparent as the same becomes better understood from the following detailed description had in conjunction with the annexed drawings wherein:

Fig. 1 illustrates the arrangement of the present apparatus for determining high intensity stresses in impulsively loaded bodies;

Fig. 2 is a bottom view of Fig. 1;

Fig. 3 schematically illustrates the general profile of the transient disturbance generated by an impulsive load;

Figs. 4a and 4b illustrate the phases of formation of an engravement as a result of the impingement of a transient disturbance against a free surface; and Fig. 5 is a view similar to Fig. 4a, illustrating the simultaneous formation of engravements of varying depths by impingement of a transient disturbance on a free surface.

The present method for assessing high intensity stresses consists, generally, in the measurement of the depth of an engravement that is formed in the surface of a body when a pellet, which has previously been affixed to that surface, is caused to be projected therefrom by the application of an impulsive or shock load to the body. The engravement is a direct consequence of the impingement of a transient disturbance against the surface and its depth is a function of average stress intensity at the surface as will hereinafter be set forth in greater detail.

One arrangement of the instant apparatus for determining high intensity stresses according to the method briefly described above is, by way of example, illustrated in Fig. 1 wherein 10 designates the body in which the stresses are to be generated and measured. To this end, the body 10 is, for example, formed with parallel surfaces 11 and 12 to the latter one of which is affixed, in a manner to be later described, a pellet 13 and in contact with the other of which surfaces is disposed an explosive charge 14, including a detonator 15, for generating the impulsive or shock load. Pellet 13 is preferably, though not necessarily, made circular in cross section, as shown in Fig. 2, with its diameter substantially greater than its length and substantially smaller than the cross sectional dimensions of the plate or body 10. Explosive charge 14 is so positioned that the stress wave produced in body 10 will impinge normally to the surface 12 in the region of the pellet. While oblique incidence of the stress wave against the surface 12 in the region of the pellet does not necessarily preclude the use of the present method in determining high intensity stresses, appropriate consideration must be given in such cases in the analysis of the data obtained to the different geometries involved. Pellet 13 may be made of the same material as the body 10 or of a different material and affixed to the surface 12 in such a manner, as by bonding it thereto by a light grease, that a compressive stress wave, but not a tensile stress wave, will be transmitted across the interface between pellet and body.

The present method of determining high intensity transient stresses through the application of the above described apparatus will now be set forth in greater detail with reference to Figs. 3 through 4b.

In general, when an elastic disturbance in the form of a transient compression stress wave is generated in a body by impulsive loading thereof, as by causing an explosive charge to be detonated thereagainst, the wave will, to a first approximation, be of the form shown in Fig. 3 wherein the line M—N represents the wave front of the disturbance which propagates at a velocity $c$ through the body in the direction of the arrow and wherein the length $V_0$ of the line M—N represents the stress intensity or particle velocity at the wave front. The curved line $V(t)$ defines the variation of stress intensity or particle velocity with time, reckoned from zero time at the wave front, or with distance along the length of the wave. That is, the specific combination of variables used to specify the disturbance can be chosen in a number of different ways. As for example, the curve of Fig. 3 may be thought of as representing any one of the following: (1) a spatial distribution of stress; (2) a spatial distribution of particle velocity; (3) a temporal distribution of stress; (4) a temporal distribution of particle velocity. Referring now to Fig. 4a, the body 10 is shown shortly after impulsive loading thereof as by detonation of the explosive charge 14 in Fig. 1. The wave front M—N has traveled to the position indicated whereby the material of the body between the wave front and the surface 12, to which the pellet 13 is affixed, remains undisturbed. It will be apparent from a consideration of Fig. 4a that portions of the wave front M—N will impinge against the free elements A—B and E—F of surface 12 which wave portions will be immediately reflected back into the body 10 as tension waves. Another portion of the wave front M—N will strike the portion of the surface 12 to which the pellet 13 is affixed, that is interface B—E, and will be transmitted across the interface B—E, since the adhesive grease or other arrangement employed to affix the pellet to the body, as previously described, will transmit a compression but not a tension wave, and will enter the pellet and move to the right as seen in Fig. 4a. Upon striking the free end surface of the pellet 13, the portion of the wave which entered the latter will be reflected as a tension wave. When the front of the last mentioned reflected wave arrives at the interface B—E between the pellet 13 and the body 10, the pellet will separate from the plate and move off toward the right as shown in Fig. 4b since, as previously stated, the adhesive grease is incapable of transmitting a tension wave. It is during the period between the time $t$ equal to zero, at the instant the wave front M—N impinges the surface 12, and a time $t_1$ at the instant the tension wave reflected from the free end surface of the pellet 13 reaches the interface B—E between the pellet 13 and the body 10, that the permanent impression or engravement is formed in the surface 12, as will be described.

It can be shown, and it is well known in the field of stress analysis, that in the case of an elastic disturbance generated by impulsive loading of a body the relationship $$\sigma = pcv \tag{1}$$

obtains where $\sigma$ is the stress resulting from loading of the body, $p$ is the density of the body, $c$ is the velocity of propagation of the transient elastic disturbance through the body, and $v$ is the particle velocity associated with the transient stress wave, particle velocity in a longitudinal stress wave being in the same direction as the direction of propagation of the wave where the latter is one of compression and in a direction opposite to the direction of propagation of the stress wave where the latter is one of tension. Since the density $p$ of, and velocity of propagation $c$ of an elastic disturbance through, a test body of a given material and shape may be readily determined, from handbooks on metal properties, it will be apparent from the above relationship that a determination of particle velocity $v$ is equivalent to a determination of stress intensity $\sigma$. The present invention, then, is concerned with a determination of particle velocity which may be accomplished by measurement of the depth of the engravement formed by the pellet 13, such depth being a function of particle velocity as will now be described.

As the initial compression stress wave, having the wave front M—N passes a given point within the body 10, there will be associated with the wave, at such point, a particle velocity having an initial value $V_0$ (Fig. 3) at the instant the wave front passes the point, the particle velocity at such point decreasing in value with the passage of the wave past the point as shown in Fig. 3. Upon striking the free surface elements A—B and E—F, portions of the initial compression wave will be immediately reflected back into the body as a tension wave. It will, therefore, be apparent that at the free surface elements A—B and E—F, there may be defined two particle velocities or particle velocity vectors, one being associated with the initial compression wave impinging upon the free surface elements and the other being associated with the tension wave reflected from the free surface elements. These particle velocities or particle velocity vectors, because of their identity of direction, as heretofore set forth, will add to give a resultant particle velocity which may be defined as a vector having twice the value of either of the individual particle velocity vectors and a direction the same as that of the direction of propagation of the initial compression stress wave through the body 10. This resultant particle velocity existing at the free surface elements will give rise to actual physical movement of the free surface elements A—B and E—F in the direction of the resultant particle velocity vector. The portion of the initial compression wave which strikes the interface B—E between the body 10 and pellet 13 will, assuming the pellet to be of the same material as the body, pass across the interface into the pellet rather than being reflected back into the body 10 as is the remainder of wave. Thus, the particle velocity existing in body 10 at the interface B—E will have a value equal to ½ the resultant particle velocity existing at the free surface elements A—B and E—F and will be in the same direction as such resultant particle velocity. The portion of the initial compression wave which passes into pellet 13 will travel to the free end surface C—D thereof and will be immediately reflected back into the pellet as a tension wave. This latter reflected tension wave will travel back through the pellet until it reaches the interface B—E whereupon separation of the pellet 13 from the body 10 will occur, since, as previously stated, the means securing the pellet to the body will transmit a compression but not a tension wave. Upon separation of pellet and body, the surface elements A—B, B—E, and E—F will all have the same particle velocity since all then are free surface elements. It is during the time interval from $t$ equal to zero, at the instant the initial compression wave strikes the free surface elements A—B and E—F and the interface B—E, to $t$ equal to $$\frac{2L}{c}$$

where L is the length of and $c$ is the velocity of propagation through the pellet, whereby $2L/c$ will be the period of time for the compression wave to travel from the interface B—E to the free end face C—D of the pellet and the reflected tension wave to travel from free end face C—D back to the interface B—E, that the engravement is formed. Thus, during said interval of time the free surface elements A—B and E—F have twice the particle velocity of the interface B—E and hence, move to the right, as seen in Figs. 4a and 4b, at twice the velocity of the interface B—E, such surface velocity differential giving rise to the engravement 16 shown in Fig. 4b. From the above, it will be apparent that engravement depth may be related to particle velocity by the equation.

$$d = \int_0^{2L/c} V(t)dt \quad (2)$$

where $d$ equals engravement depth, and $V(t)$ is the temporal distribution of particle velocity within the stress wave as shown in Fig. 3. In other words, the depth of the engravement measures directly the average particle velocity within the stress wave from its front to a point $2L$ behind the front; that is, $$d \text{ is equal to } K(V_{av}) \quad (3)$$

where $K$ is a constant and $V_{av}$ is average particle velocity.

A typical transient stress determination in an impulsively loaded body is made as illustrated in Fig. 5. The test body 10 is so shaped that the transient stress wave M—N will impinge substantially normal to the surface at which stress is to be determined. A series of pellets 13 of varying thicknesses are affixed to the surface by means, such as the light grease heretofore described, which will transmit a compression but not a tension wave or, in the alternative a plurality of similar test bodies may be prepared, to each of which one of said pellets of varying lengths (thicknesses) may be secured. After impulsive or shock loading of the body, or the bodies, as the case may be, the depths of the various engravements 16 are measured whereby to determine the average particle velocity within a stress wave from its front to a point $2L$ behind the front where $L$ is the length of the pellet associated with a particular engravement. Knowing the average particle velocity and assuming density of, and rate of propagation of the disturbance through, the test body to be known, the average value of stress within that portion of the wave determined by pellet length may be ascertained by application of Equation 1, which in the light of Equation 3, may be expressed as $\sigma = K_1(d)$. Finally, by making histogram curves from the average stress values determined as above, the temporal or spatial stress curve of Fig. 3 may be obtained. To determine the stress at other points within the test body, it is necessary to make either a plurality of such bodies having the same physical characteristics, such as density, composition, etc., but of various thicknesses or a single test body may be so prepared that the distance between the test surface and the impact surface varies whereby a given engravement depth will be a function of stress at a desired point in the body.

While the above analysis has been made with the assumption that the pellet material is the same as test body material, it may be preferable in some cases, for the reasons outlined below, that the pellet be made of a different material than that of a test body. In such cases, the physical characteristics of the materials and the geometries of the test set-up must be considered to enable an accurate determination of stress from a measurement of engravement depth. Thus, where the pellet is of different material than the test body, a portion of the initial compression wave which strikes the interface between the pellet and test body may be reflected as a tension wave or, in some cases, as a compression wave. Moreover, the velocities of propagation of the disturbance in the body and pellet may differ. Thus, in such situations, while the Equation 2 still obtains, the function $V(t)$ must be taken as representing not the temporal distribution of the particle velocity within the initial stress wave, that is the stress wave which it is desired to measure, but rather the temporal distribution of the particle velocity differential between free surface elements and the interface. Such temporal distribution of particle velocity differential may be expressed generally as $V(t)_1 = 2V(t) - V(t)_2$ where the function $V(t)$ is the temporal distribution of particle velocity within the initial compressive stress wave, that is the function whose average value it is desired to determine, and the function $V(t)_2$ is the resultant of the temporal distribution of particle velocities existing at the interface. This latter function is, as previously set forth, dependent upon the geometry of the test set-up and the physical characteristics of the materials involved. Thus, the materials of pellet and test body may be such that a portion of the initial compression wave may be reflected from the interface as a tension or compression wave, and, therefore, the function $V(t)_2$ must be considered as the vector addition of the particle velocities of the initial compressive stress wave and the stress wave reflected from the interface. A knowledge of the geometry of the test body and pellet and physical properties of pellet and body materials will enable a determination of stress wave reflection at the interface and thus permit a determination of initial compressive stress wave intensity from engravement depth. Moreover, the velocity of propagation $c$, as used in Equation 2, will be that in the pellet which may differ from that in the test body.

It is, as set forth above, desirable in some cases to make the pellet and test body from different materials since, for example, in some arrangements space limitations are critical and employing a pellet material having a lower propagation velocity $c$ may permit the use of a pellet of shorter length for a given engravement depth. Moreover, the stress waves on entering the pellet having a tendency to cause radial expansion thereof with the result that the moving free surface elements and radially expanding pellet surface interfere with each other. Such interference gives rise to inclined engravement side walls which, in some cases, renders it difficult to accurately ascertain engravement depth. Thus a poorly defined engravement produced by the use of a brass pellet and test body may be avoided by employing, for example, a brass test body and a steel pellet.

The prime advantages of the present method for determining high intensity transient stresses are economy, simplicity, ease of operation, and effectiveness in applications where severe fragmentation of the test body occurs since there need be recovered only a fragment of such size as to permit accurate measurement of engravement depth.

It will be apparent from the foregoing description that the present invention provides a novel method for accurately determining high intensity stresses in impulsively loaded bodies which method is relatively simple, economical, and which is especially valuable in applications where destruction of the test bodies occur.

It is therefore to be understood that within the scope of the appended claims the invention may be practiced otherwise than as specifically described.

What is claimed is:

1. A method for determining average stress intensity at the surface of an impulsively loaded body comprising the steps of affixing a pellet in intimate contact with a central portion of said surface and in such a manner that a compressive stress wave, but not a tensile stress wave, will be transmitted across the interface between the pellet and body, initiating within said body an elastic disturbance in the form of a transient compressive stress wave by impulsively loading said body at a point that the wave front will impinge said surface, and measuring the depth of the engravement formed in said surface by said pellet upon separation of the pellet from the body, the depth of the engravement being a function of the average intensity of said compressive stress wave from its front to a point 2L behind its front where L is pellet length.

2. A method for determining average stress intensity at the surface of an impulsively loaded body comprising the steps of affixing a pellet to said surface in intimate contact therewith by means which will transmit a compressive, but not a tensile stress wave, initiating within said body an elastic disturbance in the form of a transient compressive wave by impulsively loading said body at a point such that the wave front will impinge said surface substantially normal thereto, and measuring the depth of the engravement formed in said surface by said pellet upon separation of the pellet from the body, the depth of the engravement being a function of the average intensity of said compressive stress wave from its front to a point 2L behind its front where L is the pellet length.

3. A method for determining average stress intensity at the surface of an impulsively loaded body comprising the steps of affixing a pellet, having a pair of parallel surfaces of substantially less area than the area of said body surface, to said body surface with one of said pellet surfaces in intimate contact with said body surface by means which will transmit a compressive stress wave, but not a tensile stress wave, initiating an elastic disturbance in the form of a transient compressive stress wave within said body by impulsively loading the latter at a point such that the wave front will impinge said body surface substantially normal thereto, and measuring the depth of the engravement formed in said surface by said pellet upon separation of the latter from the body, the depth of the engravement being a function of the average intensity of said compressive stress wave from its front to a point 2L behind its front where L is the distance between pellet surfaces.

4. A method for determining average stress intensity at the surface of an impulsively loaded body comprising the steps of providing a cylindrical pellet having a pair of parallel end surfaces, affixing said pellet to said body surface with one of said pellet surfaces in intimate contact with the body surface and in such a manner that a compressive stress wave, but not a tensile stress wave, will be transmitted across the interface between the pellet and body, initiating within said body an elastic disturbance in the form of a transient compressive stress wave by impulsively loading said body at a point such that the wave front will impinge said interface and adjacent body surface substantially normal thereto, and measuring the depth of the engravement formed in said body surface by the pellet upon separation of the latter from the body, the depth of the engravement being a function of the average intensity of said compressive stress wave from its front to a point 2L behind its front where L is the pellet length.

5. A method for determining average stress intensity at the surface of an impulsively loaded body comprising the steps of affixing a pellet to said surface in intimate contact therewith and in such a manner that a compressive wave, but not a tensile stress wave, will be transmitted across the interface between the pellet and body, initiating within said body an elastic disturbance in the form of a transient compressive stress wave by impulsively loading said body at a point such that the wave front will impinge normally to said interface and adjacent body surface, and measuring the depth of the engravement formed in said surface by said pellet upon separation of the latter from the body, the depth of the engravement being equal to $K(o)$ where $K$ is a constant and $(o)$ is the average intensity at said surface of the compressive stress wave from its front to a point 2L behind its front wheel L is the length of the pellet.

6. A method for determining average stress intensity at the surface of an impulsively loaded body comprising the steps of affixing a pellet, having a pair of parallel surfaces, to said body surface with one of said pellet surfaces in intimate contact with said body surface by means which will transmit a compressive stress wave but not a tensile stress wave, initiating within said body an elastic disturbance in the form of a transient compressive stress wave by impulsively loading said body at a point such that the wave front will impinge said body surface substantially normal thereto, and measuring the depth of the engravement formed in said body surface by said pellet upon separation of the latter from the body, the depth of the engravement being equal to $K(o)$ where $K$ is a constant and $(o)$ is the average value at said surface of the intensity of the compressive stress wave from its front to a point 2L behind its front where L is the length of the pellet.

7. A method for determining the average stress intensity at the surface of an impulsively loaded body comprising the steps of providing a cylindrical pellet having a pair of parallel end surfaces of substantially less area than the area of said body surface, affixing said pellet to a central portion of said body surface with one of said pellet surfaces in intimate contact with said body surface and in such a manner that a compressive stress wave only will be transmitted across the interface between the pellet and body, initiating within said body an elastic disturbance in the form of a compressive stress wave by impulsively loading said body at such a point that the wave front will impinge said interface and adjacent body surface substantially normal thereto, and measuring the depth of the engravement formed in said body surface by the pellet upon separation of the latter from the body, the depth of the engravement being equal to $K(o)$ where $K$ is a constant and $(o)$ is the average intensity at the body surface of the compressive stress wave from its front to a point 2L behind its front where L is the distance between said pellet surfaces.

8. A method for assessing the transient stress wave at the surface of a body resulting from impulsive loading of the latter, comprising the steps of affixing a plurality of pellets of varying length to said surface in intimate contact therewith and in such a manner that a compressive stress wave but not a tensile stress wave will be transmitted across the interfaces between said body and pellets, initiating an elastic disturbance in the form of a transient compressive stress wave within said body by impulsively loading the latter at a point such that the wave front will impinge each of said interfaces and adjacent body surface substantially normal thereto, and measuring the depth of the engravements formed in the body surface by said pellets upon separation of the latter from the body, the depth of each of said engravements being a function of the average intensity of said compressive stress wave from its front to a point 2L behind its front where L is the length of the pellet associated with a given engravement.

9. A method for assessing the transient stress wave at the surface of a body resulting from impulsive loading of the latter, comprising the steps of affixing a plurality of pellets of varying length but of the same cross sectional area to said body surface in intimate contact therewith and in such a manner that a compressive stress wave, but not a tensile stress wave will be transmitted across the interfaces between the body and pellets, initiating within said body an elastic disturbance in the form of a transient compressive stress wave by impulsively loading said body at a point such that the wave front will impinge said interfaces and adjacent body surface substantially normal thereto and measuring the depth of the engravements formed in said body surface by said pellets upon separation of the latter from the body, the depth of each engravement being equal to $K(o)$ where $K$ is a constant and (o) is the average intensity of the compressive stress wave from its front to a point 2L behind its front where L is the length of the pellet associated with a given engravement.

10. A method for assessing transient stress wave generated within a body by impulsive loading thereof, comprising the steps of affixing a plurality of pellets to and in intimate contact with the surface of said body in such a manner that only a compressive stress wave will be transmitted across the interface between each pellet and the body and at such points on the surface of the body that at least some of said interfaces will be of varying distances from that portion of the body surface at which the impulsive load is applied with each of said interfaces and body surfaces adjacent thereto so disposed relative to the impulsively loaded portion of the body surface that the wave front will impinge each of said interfaces and body surface adjacent thereto substantially normally, impulsively loading said portion of the body surface in such a manner as to generate within said body an elastic disturbance in the form of a compressive stress wave, and measuring the depth of each of the engravements formed in said body surface by said pellets upon separation of the latter from the body, the depth of each of said engravements being a function of the average intensity of said compressive stress wave, at that portion of the body surface in which said engravement is formed, from the wave front to a point 2L behind the wave front, where L is the length of the pellet associated with the given engravement.

11. A method for determining at the surface of a body the average particle velocity associated with a transient stress wave generated within the body by impulsive loading thereof, comprising the steps of affixing to the surface of said body and in intimate contact therewith a pellet by means which will transmit a compressive, but not a tensile, stress wave, impulsively loading said body in such a manner so as to generate within the latter an elastic disturbance in the form of a compressive stress wave and in such a manner that the wave front will impinge substantially normal to said surface, and measuring the depth of the engravement formed in said surface by the pellet upon separation of the latter from the body, the depth of the engravement being a function of the average particle velocity associated with the compressive stress wave from its front to a point 2L behind its front where L is the length of the pellet.

12. The method according to claim 1 wherein such pellet material is of the same as said body material.

13. The method according to claim 1 wherein such pellet material is different than said body material.

14. The method according to claim 8 wherein the material comprising each of said pellets is different than the material comprising said body.

15. The method according to claim 8 wherein material comprising each of said pellets is the same as the material comprising said body.

16. A method of determining stress intensity at the surface of an impulsively loaded body whose density and through which the rate of propagation of an elastic disturbance are known, comprising the steps of initiating an elastic disturbance in the form of a compressive stress wave within said body by impulsively loading the latter in such a manner that the wave front will impinge said surface substantially normal thereto, retaining a second body, whose density and through which the rate of propagation of an elastic disturbance are known, in intimate contact with a portion of said surface for at least that known interval of time during which the elastic disturbance passes from said surface through the second body to the wall opposite that which is in contact with said surface and back to said surface, and measuring the depth of the engravement formed by said second body in said surface, the depth of the engravement being a function of average stress intensity at said surface during said known interval of time.

17. A method of assessing the transient stress wave at the surface of a body resulting from impulsive loading of the latter, comprising the steps of initiating an elastic disturbance in the form of a compressive stress wave within said body by impulsively loading the latter in such a manner that the wave front will impinge said surface substantially normal thereto, retaining a plurality of pellets in intimate contact with said surface for different known intervals of time which are equal in each case, to at least that known interval of time during which the wave front passes from said surface through the pellet to the wall opposite that which is in contact with said surface and back to said surface, and measuring the depth of the engravements formed by such pellets in said surface, the depth of each engravement being a function of the average stress intensity at said surface during said known interval of time.

18. A method of assessing the intensity of a stress wave in a body resulting from impulsive loading of the latter comprising the steps of placing a pellet in releasable but intimate abutting contact with the surface of said body, impulsively loading said body in such a manner as to generate therein an elastic disturbance in the form of a compressive stress wave, and measuring the depth of the engravement formed in said surface upon separation of the pellet from the body as a result of the movement of the wave.

References Cited in the file of this patent

UNITED STATES PATENTS

| | | |
|---|---|---|
| 2,280,226 | Firestone | Apr. 21, 1942 |
| 2,454,793 | Grogan | Nov. 30, 1948 |
| 2,620,652 | Hartmann | Dec. 9, 1952 |